United States Patent
Fujiki et al.

(10) Patent No.: US 9,451,123 B2
(45) Date of Patent: Sep. 20, 2016

(54) IMAGE PROCESSING APPARATUS

(71) Applicant: KYOCERA Document Solutions Inc.

(72) Inventors: Atsushi Fujiki, Osaka (JP); Kunihiko Shimamoto, Osaka (JP); Yuya Tagami, Osaka (JP)

(73) Assignee: Kyocera Document Solutions Inc.

( * ) Notice: Subject to any disclaimer, the term of this patent is extended or adjusted under 35 U.S.C. 154(b) by 0 days.

(21) Appl. No.: 14/605,113

(22) Filed: Jan. 26, 2015

(65) Prior Publication Data

US 2015/0213298 A1 Jul. 30, 2015

(30) Foreign Application Priority Data

Jan. 29, 2014 (JP) ................. 2014-014936

(51) Int. Cl.
*G06K 7/10* (2006.01)
*H04N 1/32* (2006.01)

(52) U.S. Cl.
CPC ...... *H04N 1/32352* (2013.01); *H04N 1/32144* (2013.01); *H04N 2201/3269* (2013.01)

(58) Field of Classification Search
USPC ........................................ 235/462.01–462.49
See application file for complete search history.

(56) References Cited

FOREIGN PATENT DOCUMENTS

| JP | 2009-295108 | 12/2009 |
|---|---|---|
| JP | 2010-171596 | 5/2010 |

*Primary Examiner* — Jamara Franklin

(57) ABSTRACT

A 2D code detecting unit 12 detects 2D codes in a document image. A 2D code decoding unit 14 decodes the detected plural 2D codes, and generates corresponding plural pieces of decoded data. An order identifying unit 13 identifies an order of the plural pieces of decoded data on the basis of an orientation of the detected plural 2D codes.

4 Claims, 7 Drawing Sheets

IMAGE PROCESSING APPARATUS

CROSS-REFERENCE TO RELATED APPLICATIONS

This application relates to and claims priority rights from Japanese Patent Application No. 2014-014936, filed on Jan. 29, 2014, the entire disclosures of which are hereby incorporated by reference herein.

BACKGROUND

1. Field of the Present Disclosure

The present disclosure relates to an image processing apparatus.

2. Description of the Related Art

An image processing apparatus scans a document that includes plural two dimensional codes (hereinafter called as "2D codes"), decodes the plural 2D codes in the document, and performs data processing on the basis of the decoded data.

When plural 2D codes are arranged on a document, the plural 2D codes are arranged on the document in a prespecified order; and in a document image obtained by scanning the document, the plural 2D codes are decoded in the prespecified order, and plural pieces of the decoded data of the plural 2D codes are automatically assigned to respective predetermined uses in accordance with the prespecified order.

FIG. 6 shows a diagram that indicates an example of a document in which plural 2D codes 201 to 205 are arranged. In the document shown in FIG. 6, the aforementioned prespecified order is the order of the 2D code 201, the 2D code 202, the 2D code 203, the 2D code 204, and then the 2D code 205.

In the example shown in FIG. 6, the order is specified along a sequence in the horizontal direction of the document (i.e. the primary scanning direction of the document image in its proper orientation), and a 2D code next to the last 2D code in such a horizontal sequence is the first 2D code in a next horizontal sequence in the vertical direction of the document (i.e. the secondary scanning direction of the document image in its proper orientation).

Therefore, in the example shown in FIG. 6, the decoded data of the 2D code 201 is used for the use to which the first decoded data is assigned, the decoded data of the 2D code 202 is used for the use to which the second decoded data is assigned, the decoded data of the 2D code 203 is used for the use to which the third decoded data is assigned, the decoded data of the 2D code 204 is used for the use to which the fourth decoded data is assigned, and the decoded data of the 2D code 205 is used for the use to which the fifth decoded data is assigned.

If such a document is arranged in a wrong orientation when the document is scanned for obtaining a document image thereof, then the 2D codes are decoded in the prespecified order in the document image obtained from the document having the wrong orientation, and plural pieces of the decoded data of the plural 2D codes are automatically assigned to respective predetermined uses in accordance with the prespecified order, and consequently, the plural pieces of the decoded data of the plural 2D codes are automatically assigned to wrong uses.

FIG. 7 shows a diagram that indicates a document image obtained by scanning the document shown in FIG. 6 rotated by 180 degrees. For example, as shown in FIG. 7, if a document image is obtained by scanning a document rotated by 180 degrees, the decoded data of the 2D code 205 is wrongly used for the use to which the first decoded data is assigned, the decoded data of the 2D code 204 is wrongly used for the use to which the second decoded data is assigned, the decoded data of the 2D code 202 is wrongly used for the use to which the fourth decoded data is assigned, and the decoded data of the 2D code 201 is wrongly used for the use to which the fifth decoded data is assigned.

SUMMARY

An image processing apparatus according to an aspect of the present disclosure includes a 2D code detecting unit, a 2D code decoding unit, and an order identifying unit. The 2D code detecting unit is configured to detect plural 2D codes in a document image. The 2D code decoding unit is configured to decode the detected plural 2D codes and generate plural pieces of decoded data. The order identifying unit is configured to identify an order of the plural pieces of decoded data on the basis of an orientation of the detected plural 2D codes.

These and other objects, features and advantages of the present disclosure will become more apparent upon reading of the following detailed description along with the accompanied drawings.

DETAILED DESCRIPTION

Hereinafter, an embodiment according to aspects of the present disclose will be explained with reference to drawings.

Figure 1:
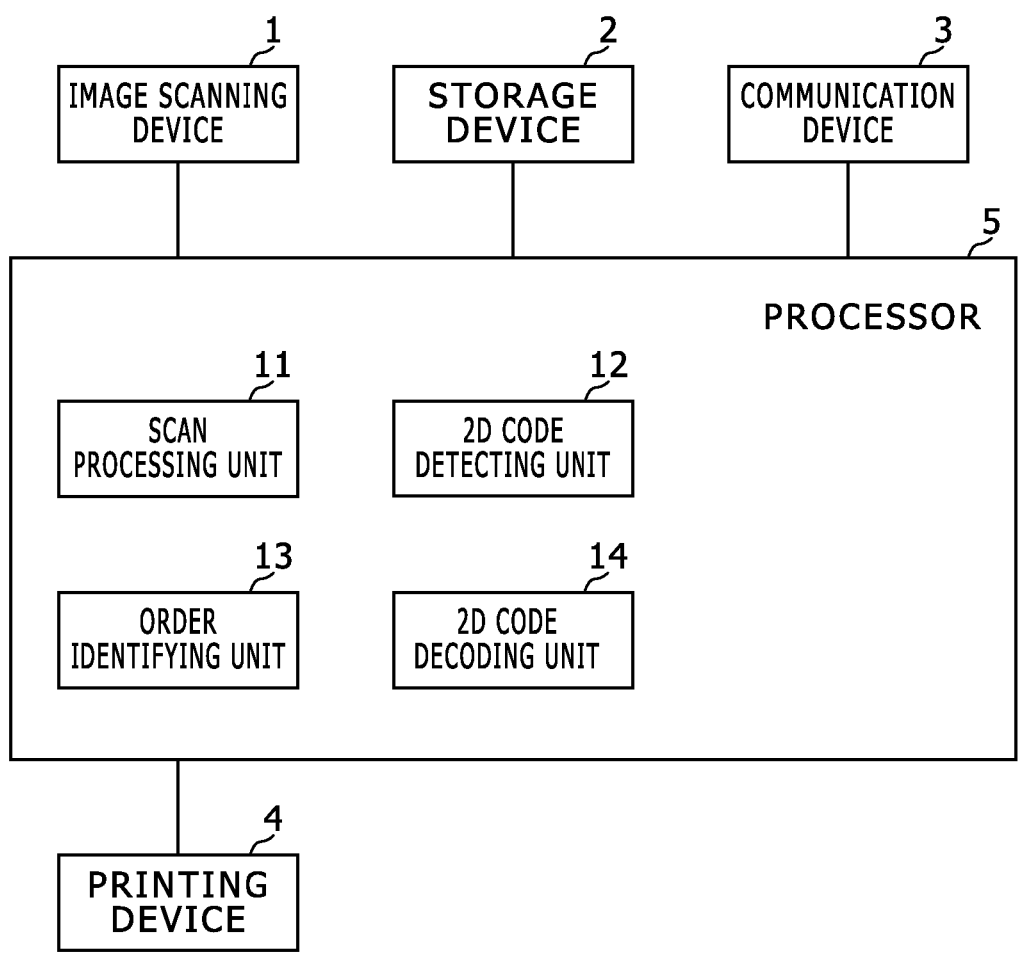
FIG. 1 shows a block diagram that indicates a configuration of an image processing apparatus according to an embodiment of the present disclosure.

FIG. 1 shows a block diagram that indicates a configuration of an image processing apparatus according to an embodiment of the present disclosure. This image processing apparatus includes an image scanning device 1, a storage device 2, a communication device 3, a printing device 4, and a processor 5.

The image scanning device 1 is an internal device that optically scans a document image of a document, and generates image data (RGB data, here) of the document image.

The storage device 2 is a device capable of storing data and programs. A non-volatile storage medium with a large capacity is used as the storage device 2, such as non-volatile memory or hard disk drive. The storage device 2 is enabled, for example, to store the image data of the document image.

The communicating device 3 is a device which performs data communication with an external device. A network interface which performs network communication, a modem which performs facsimile communication or the like is used as the communicating device 3.

The printing device 4 performs printing of a document image based on image data (here, CMYK data) of the document image for which image processing such as color conversion and halftone process for printing has been processed.

The processor 5 is a computer which includes a CPU (Central Processing Unit), a ROM (Read Only Memory), and a RAM (Random Access Memory), loads a program from the ROM or the storage device 2 to the RAM, and executes the program with the CPU to embody various processing units. In this embodiment, a scan processing unit 11, a 2D code detecting unit 12, an order identifying unit 13, a 2D code decoding unit 14, and the like are embodied in the processor 5.

The scan processing unit 11 controls the image scanning device 1, acquires a document image, and stores image data of the document image in the storage device 2, the RAM, or the like.

The 2D code detecting unit 12 detects 2D codes (e.g. QR codes (registered trademark)) in the document image. In this embodiment, the 2D code detecting unit 12 detects a 2D code by detecting position detection patterns in the 2D code.

The order identifying unit 13 identifies an order of plural pieces of decoded data of the detected plural 2D codes on the basis of an orientation of the detected plural 2D codes.

If the orientation of the detected plural 2D codes is a prespecified orientation, the order identifying unit 13 identifies the order of the plural pieces of decoded data as a prespecified order. Otherwise, if the orientation of the detected plural 2D codes is not the prespecified orientation, the order identifying unit 13 identifies the order of the plural pieces of decoded data as an order that corresponds to the orientation of the detected plural 2D codes and is different from the prespecified order.

The orientation of the 2D codes is identified on the basis of positions of plural detection patterns in the 2D codes by the 2D code detecting unit 12 or the order identifying unit 13.

Figure 2:
FIG. 2 shows a diagram that indicates an example of a 2D code.

FIG. 2 shows a diagram that indicates an example of a 2D code. The 2D code shown in FIG. 2 is a QR code (registered trademark). As shown in FIG. 2, a 2D code has three position detection patterns 101a, 101b and 101c in its inside. The position detection pattern 101b is located in a first direction from the position detection pattern 101a. The position detection pattern 101c is located in a second direction from the position detection pattern 101a, and the second direction is perpendicular to the first direction (here, rotates by −90 degrees from the first direction).

Therefore, the document image (i.e. the 2D code) is rotated from the prespecified direction by an angle between the aforementioned first direction and the primary scanning direction of the document image (i.e. the 2D code), and on the basis of this fact, the orientation of the document image (i.e. the 2D code) is identified.

The 2D code decoding unit 14 decodes the plural 2D codes detected by the 2D code detecting unit 12, and generates corresponding plural pieces of decoded data.

If the 2D code is a QR code (registered trademark), the 2D code decoding unit 14 acquires version information and format information in the 2D code, reads coded data from the 2D code on the basis of the version information and format information, and decodes the coded data with error correction.

In this embodiment, if the orientation of the detected plural 2D codes is a prespecified orientation, the 2D code decoding unit 14 decodes the plural 2D codes in turn in the prespecified order, and otherwise, if the orientation of the detected plural 2D codes is not the prespecified orientation, the 2D code decoding unit 14 decodes the plural 2D codes in turn in an order that corresponds to the orientation of the detected plural 2D codes and is different from the prespecified order.

Figure 3:
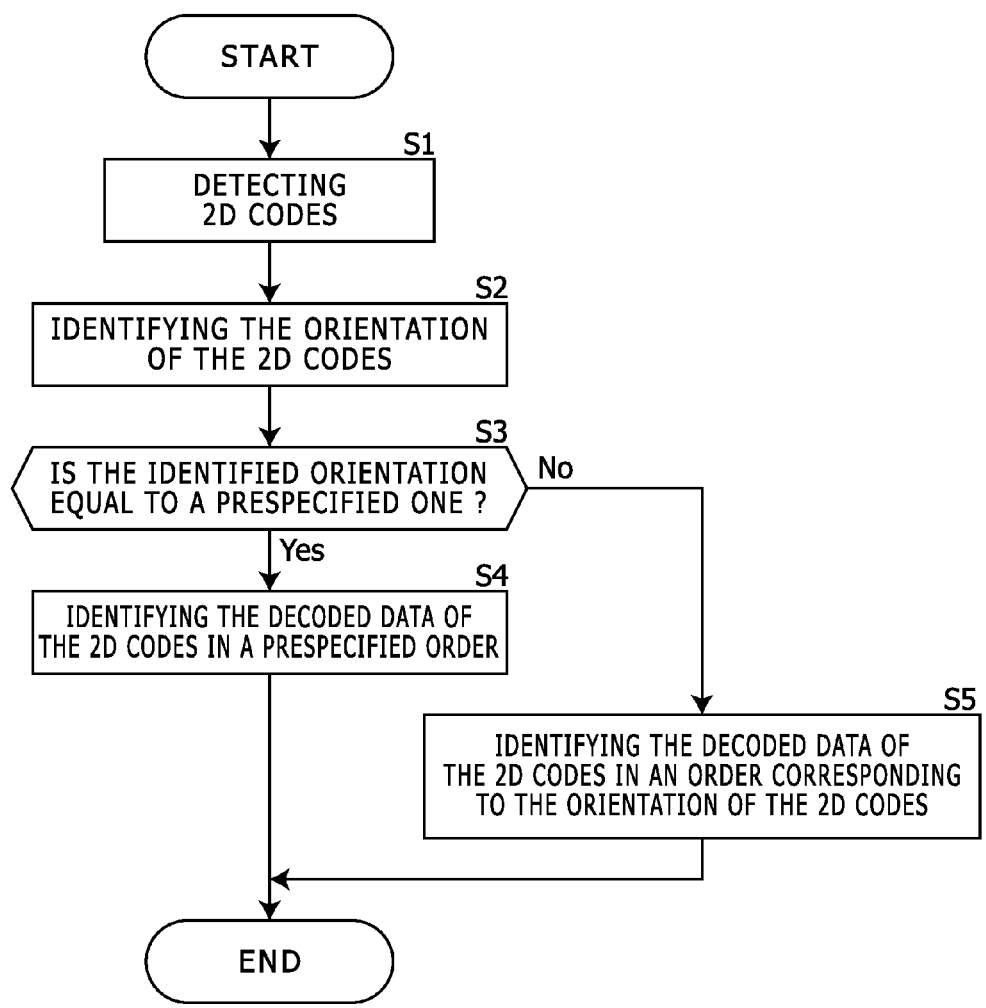
FIG. 3 shows a flowchart that explains a behavior of the image processing apparatus shown in FIG. 1.

The following part explains a behavior of the aforementioned image processing apparatus. FIG. 3 shows a flowchart that explains a behavior of the image processing apparatus shown in FIG. 1.

When a predetermined user operation is detected in an operation panel (not shown), the scan processing unit 11 controls the image scanning device 1, acquires a document image of a document set on the image scanning device 1, and stores image data of the document image in the storage device 2, the RAM, or the like. The 2D code detecting unit 12 detects 2D codes in the document image (in Step S1), and identifies an orientation of the 2D codes in the document image (in Step S2).

The order identifying unit 13 determines whether the identified orientation of the 2D codes is a prespecified orientation or not (in Step S3).

If the identified orientation of the 2D codes is the prespecified orientation, then the 2D code decoding unit 14 decodes the plural 2D codes in turn in a prespecified order, and the order identifying unit 13 determines the order of the plural pieces of the decoded data as the decoding order (in Step S4).

Contrarily, if the identified orientation of the 2D codes is not the prespecified orientation, then the 2D code decoding unit 14 decodes the plural 2D codes in turn in an order that corresponds to the orientation of the detected plural 2D codes and is different from the prespecified order, and the order identifying unit 13 determines the order of the plural pieces of the decoded data as the decoding order (in Step S5).

Figure 4:
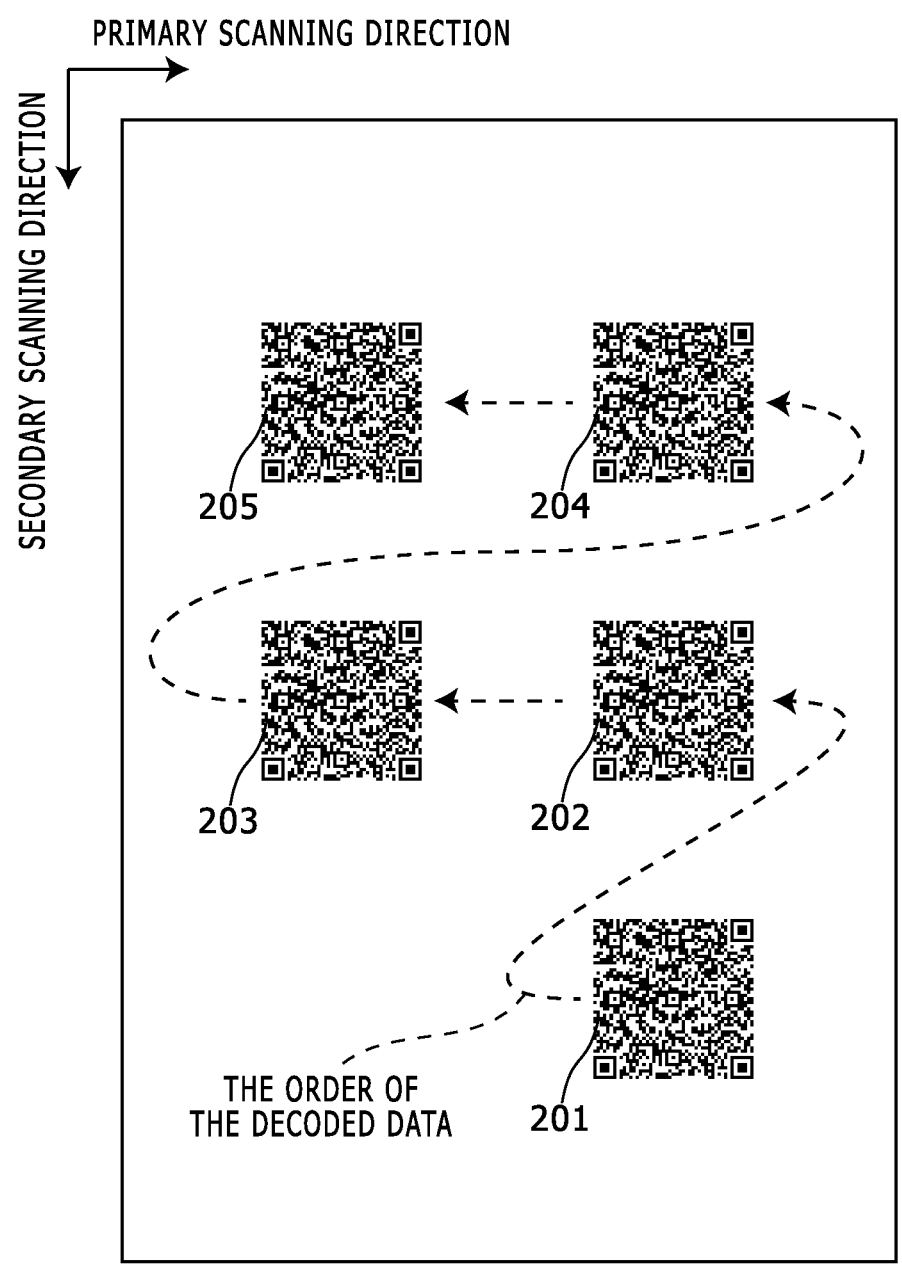
FIG. 4 shows a diagram that indicates an order of plural pieces of decoded data in the image processing apparatus shown in FIG. 1 in a case that the document shown in FIG. 6 is rotated by 180 degrees.
Figure 6:
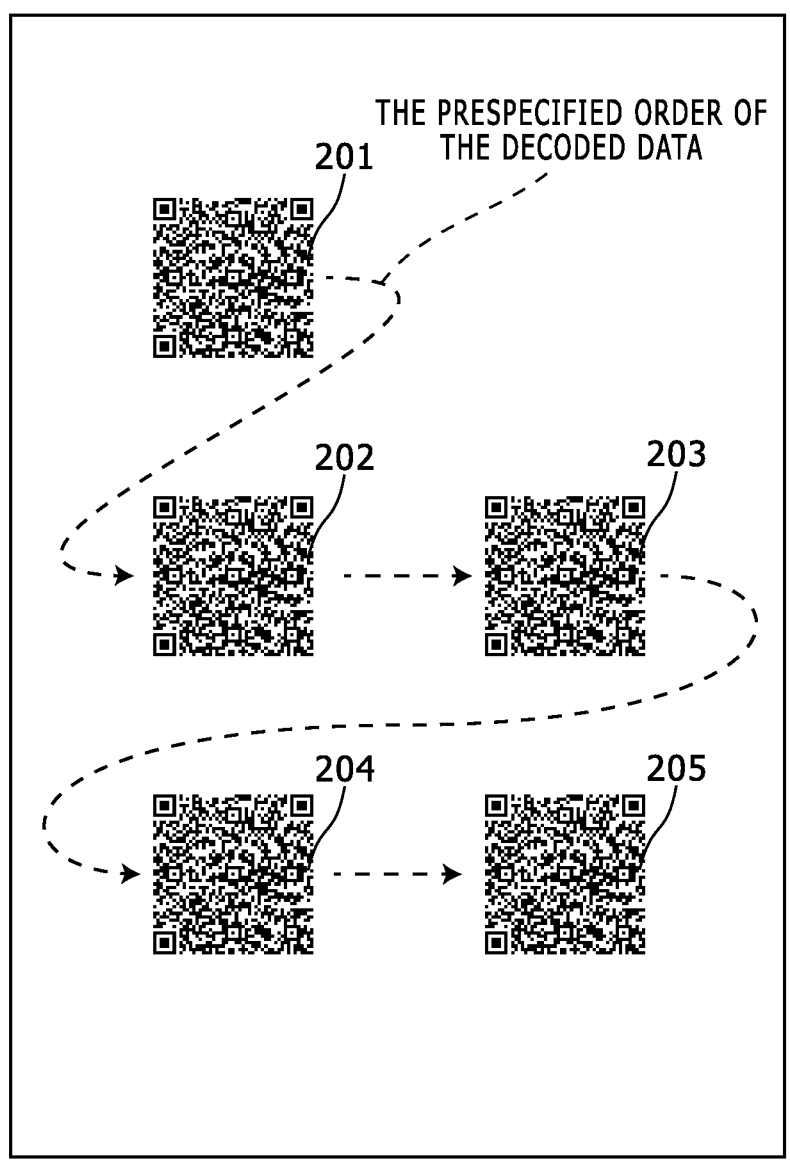
FIG. 6 shows a diagram that indicates an example of a document in which plural 2D codes 201 to 205 are arranged.
Figure 7:
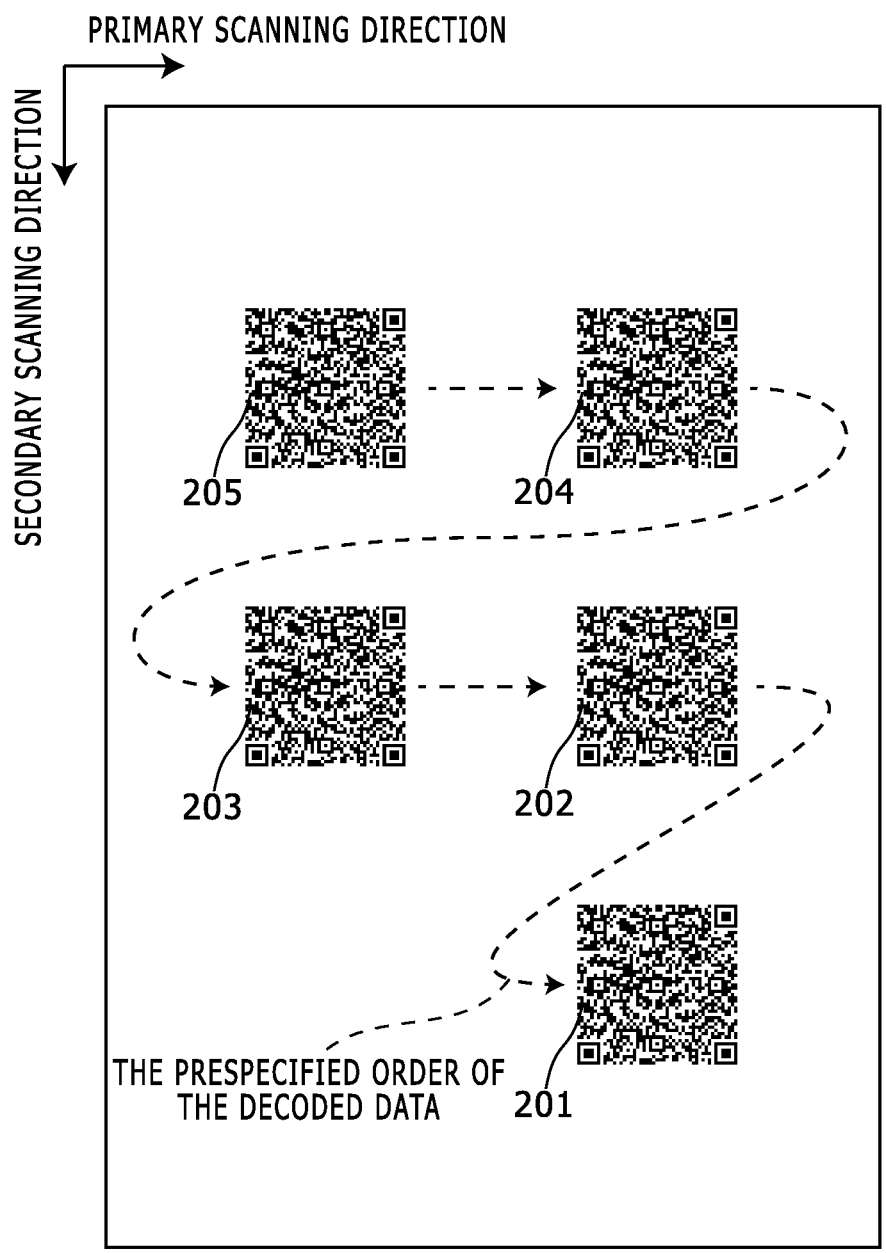
FIG. 7 shows a diagram that indicates a document image obtained by scanning the document shown in FIG. 6 rotated by 180 degrees.

FIG. 4 shows a diagram that indicates an order of plural pieces of decoded data in the image processing apparatus shown in FIG. 1 in a case that the document shown in FIG. 6 is rotated by 180 degrees.

For example, as shown in FIG. 4, if the document is rotated by 180 degrees, the 2D codes 201 to 205 are decoded in a reverse order of the prespecified order, and this decoding order is considered to the order of the 2D codes 201 to 205. Therefore, in this case, even though the document is rotated by 180 degrees, the decoded data of the 2D code 201 is correctly used for the use to which the first decoded data is assigned, the decoded data of the 2D code 202 is correctly used for the use to which the second decoded data is assigned, the decoded data of the 2D code 203 is correctly used for the use to which the third decoded data is assigned, the decoded data of the 2D code 204 is correctly used for the use to which the fourth decoded data is assigned, and the decoded data of the 2D code 205 is correctly used for the use to which the fifth decoded data is assigned.

Figure 5:
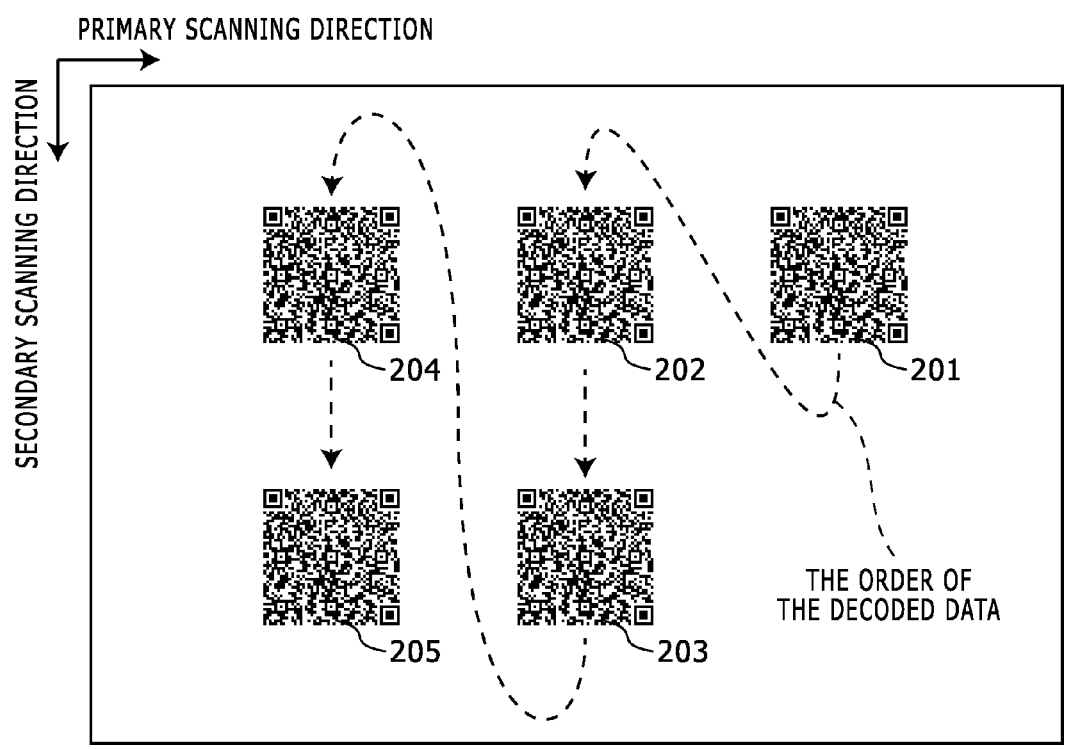
FIG. 5 shows a diagram that indicates an order of plural pieces of decoded data in the image processing apparatus shown in FIG. 1 in a case that the document shown in FIG. 6 is rotated by −90 degrees.

FIG. 5 shows a diagram that indicates an order of plural pieces of decoded data in the image processing apparatus shown in FIG. 1 in a case that the document shown in FIG. 6 is rotated by −90 degrees.

If the orientation of the document is rotated by −90 degrees, then the order is specified along a sequence in the vertical direction of the document (i.e. the secondary scanning direction of the document image in its proper orientation), and a 2D code next to the last 2D code in such a vertical sequence is the first 2D code in a previous vertical sequence in the horizontal direction of the document (i.e. the primary scanning direction of the document image in its proper orientation). Further, if the orientation of the document is rotated by +90 degrees, then the 2D codes 201 to 205 are decoded in a reverse order of the order in the case that the orientation of the document is rotated by −90 degrees, and this decoding order is considered to the order of the 2D codes 201 to 205.

In the aforementioned embodiment, the 2D code detecting unit 12 detects 2D codes in a document image, and the 2D code decoding unit 14 decodes the detected plural 2D codes, and generates corresponding plural pieces of decoded data. The order identifying unit 13 identifies an order of the plural pieces of decoded data on the basis of an orientation of the detected plural 2D codes.

Therefore, regardless of the orientation of the document, the order of plural pieces of decoded data of the plural 2D code is properly identified.

The description has been presented for purposes of illustration and description, and is not intended to be exhaustive or limited.

For example, in the aforementioned embodiment, the decoding order of plural 2D codes in a document image is selected in accordance with the orientation of the 2D codes and the decoding order is considered to the order of plural pieces of decoded data of the 2D codes. Alternatively, it may be configured that plural 2D codes in a document image are decoded in the prespecified order and plural pieces of the decoded data of the 2D codes in the decoding order (i.e. the prespecified order) are rearranged in the aforementioned order that corresponds to the orientation of the 2D codes.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   a 2D code detecting unit configured to detect plural 2D codes in a document image;
   a 2D code decoding unit configured to decode the detected plural 2D codes and generate plural pieces of decoded data; wherein said plural pieces of decoded data from said plural 2D codes are to be read in a particular order amongst the plural 2D codes in the document image; and
   an order identifying unit configured to identify said particular order of the plural pieces of decoded data on the basis of an orientation of the detected plural 2D codes in said document image.

2. The image processing apparatus according to claim 1, wherein the order identifying unit is further configured to: if the orientation of the detected plural 2D codes is a prespecified orientation, identify the order of the plural pieces of decoded data as a prespecified order, and if the orientation of the detected plural 2D codes is rotated approximately 180 degrees from said prespecified orientation, identify the order of the plural pieces of decoded data as in reverse from the prespecified order.

3. The image processing apparatus according to claim 1, wherein the orientation of the 2D codes is identified on the basis of positions of plural detection patterns in the 2D codes.

4. The image processing apparatus according to claim 1, wherein the 2D code decoding unit is further configured to: if the orientation of the detected plural 2D codes is a prespecified orientation, decode the plural 2D codes in turn in the prespecified order, and if the orientation of the detected plural 2D codes is not the prespecified orientation, decode the plural 2D codes in turn in an order that corresponds to the orientation of the detected plural 2D codes and is different from the prespecified order.

* * * * *